United States Patent
Roberson

(10) Patent No.: US 12,295,439 B2
(45) Date of Patent: May 13, 2025

(54) HANDS-FREE UTILITY BELT

(71) Applicant: Paul Roberson, Las Vegas, NV (US)

(72) Inventor: Paul Roberson, Las Vegas, NV (US)

(*) Notice: Subject to any disclaimer, the term of this patent is extended or adjusted under 35 U.S.C. 154(b) by 323 days.

(21) Appl. No.: 17/892,896

(22) Filed: Aug. 22, 2022

(65) Prior Publication Data

US 2023/0074753 A1    Mar. 9, 2023

Related U.S. Application Data

(60) Provisional application No. 63/241,976, filed on Sep. 8, 2021.

(51) Int. Cl.
| | | |
|---|---|---|
| A41F 9/00 | (2006.01) | |
| A45F 5/02 | (2006.01) | |
| A63B 69/00 | (2006.01) | |

(52) U.S. Cl.
CPC .............. *A41F 9/007* (2013.01); *A45F 5/021* (2013.01); *A63B 69/002* (2013.01); *A63B 69/0059* (2013.01); *A63B 2243/007* (2013.01)

(58) Field of Classification Search
CPC ........ A41F 9/007; A45F 5/021; A63B 69/002; A63B 69/0059
See application file for complete search history.

(56) References Cited

U.S. PATENT DOCUMENTS

| | | | |
|---|---|---|---|
| 1,601,624 A * | 9/1926 | Houghton | ................. A45F 5/00 224/648 |
| 1,994,097 A | 3/1935 | Esau | |
| 1,995,783 A | 3/1935 | Svoren | |
| 2,194,734 A | 3/1940 | Brenner | |
| 2,356,715 A | 8/1944 | Webster | |

(Continued)

FOREIGN PATENT DOCUMENTS

| | | |
|---|---|---|
| CA | 2582245 A1 | 10/2008 |
| DE | 3042235 A1 | 5/1982 |

(Continued)

OTHER PUBLICATIONS

Jeremy Anderson et al., Hands-Free Dog Leash, Acme Design Group Final Report ME4182, Mar. 9, 1998, http://helix.gatech.edu/Classes/ME4182/1998Q1/webs/adg/memos/final.html.

(Continued)

*Primary Examiner* — Derek J Battisti
(74) *Attorney, Agent, or Firm* — Howard & Howard Attorneys PLLC

(57) ABSTRACT

A hands-free utility belt system is disclosed. The utility belt system includes a flexible belt, a removable bumper locking mechanism, a bumper, and a lead carrier. The flexible belt includes a plurality of apertures and has a first section and a second section, wherein the first section is configured to overlap the second section. The removable bumper locking mechanism is configured to lock together the first section and the second section of the belt. The removable bumper locking mechanism includes a lock and a mounting plate. The lock is configured to couple the removable locking system to the flexible belt through one of the plurality of apertures. The bumper is coupled to the mounting plate. The lead carrier is coupled to the belt and includes a body having an opening on one side and at least one micro-roller, and a lead connector coupled to the body by a post.

14 Claims, 16 Drawing Sheets

(56) References Cited

U.S. PATENT DOCUMENTS

| | | | |
|---|---|---|---|
| 2,725,853 | A | 12/1955 | Nordheim |
| 3,004,519 | A | 10/1961 | Weissman |
| 3,721,216 | A | 3/1973 | Lippe et al. |
| 3,868,786 | A | 3/1975 | Lippe et al. |
| 4,151,936 | A | 5/1979 | Hawkes |
| 4,275,880 | A * | 6/1981 | Murphy ................ F16C 19/507 |
| | | | 482/43 |
| 4,860,560 | A | 8/1989 | Lundelius |
| 4,862,833 | A | 9/1989 | Brotz |
| 4,915,666 | A | 4/1990 | Maleyko |
| 4,977,860 | A | 12/1990 | Harwell |
| 5,080,045 | A | 1/1992 | Reese et al. |
| 5,136,858 | A | 8/1992 | Bruner |
| 5,161,486 | A | 11/1992 | Brown |
| 5,718,189 | A | 2/1998 | Blake |
| 5,842,444 | A | 12/1998 | Perrulli |
| 6,217,482 | B1 | 4/2001 | Yoo et al. |
| 6,450,129 | B1 | 9/2002 | Flynn |
| 6,520,290 | B1 | 2/2003 | Carter |
| 6,837,188 | B1 | 1/2005 | Martin |
| 7,467,604 | B1 | 12/2008 | Werner et al. |
| D610,751 | S | 2/2010 | Kokmeyer |
| 7,814,866 | B1 | 10/2010 | Gramza |
| 7,992,506 | B1 | 8/2011 | Patton et al. |
| 8,342,137 | B1 | 1/2013 | Burkhardt |
| 8,622,028 | B2 | 1/2014 | Ekstrum |
| 8,919,292 | B1 | 12/2014 | Wang et al. |
| 10,143,184 | B1 | 12/2018 | Lane |
| 10,188,080 | B2 * | 1/2019 | Jasmine, Sr. .......... A01K 29/00 |
| 10,292,368 | B1 | 5/2019 | Pierog |
| 11,266,224 | B2 * | 3/2022 | Landano ................... A41F 9/02 |
| 2004/0194733 | A1 | 10/2004 | Bremm |
| 2005/0117989 | A1 | 6/2005 | Ewles |
| 2009/0044763 | A1 | 2/2009 | Russo et al. |
| 2010/0024742 | A1 | 2/2010 | Honeycutt et al. |
| 2010/0089338 | A1 | 4/2010 | Stern |
| 2013/0042818 | A1 | 2/2013 | Capoano |
| 2013/0042819 | A1 * | 2/2013 | Ekstrum ................ A01K 27/00 |
| | | | 119/770 |
| 2013/0085046 | A1 * | 4/2013 | Jolly .................... A63B 23/025 |
| | | | 482/129 |
| 2014/0115756 | A1 | 5/2014 | Anderson |
| 2014/0342879 | A1 * | 11/2014 | Ebsen ................ A63B 21/4009 |
| | | | 482/23 |
| 2015/0013619 | A1 * | 1/2015 | Kahana, Jr. ............... A01K 1/04 |
| | | | 119/770 |
| 2015/0075448 | A1 | 3/2015 | Clark et al. |
| 2016/0324125 | A1 | 11/2016 | Jasmine, Sr. |
| 2018/0140892 | A1 * | 5/2018 | Thomas ............. A63B 21/0004 |
| 2021/0045355 | A1 | 2/2021 | Hanley |

FOREIGN PATENT DOCUMENTS

| | | |
|---|---|---|
| DE | 10214640 A1 | 10/2003 |
| DE | 10 2004 041 000 A1 | 3/2006 |
| DE | 202015100197 U1 | 1/2015 |

OTHER PUBLICATIONS

Squishy Face Studio, Leash Belt, http://www.squishyfacestudio.com/leash-belt-3/.

* cited by examiner

HANDS-FREE UTILITY BELT

CROSS-REFERENCE TO RELATED APPLICATIONS

This application claims priority to U.S. Provisional Patent Application No. 63/241,976, filed on Sep. 8, 2021, which is incorporated by reference herein in its entirety.

TECHNICAL FIELD

The present invention generally concerns utility belts. More particularly, the present invention relates to a hands-free utility belt.

BACKGROUND OF THE INVENTION

Utility belts and leashes may be used to connect a user to something else, which could be stationary (e.g., a wall or floor, such as for safety during a construction project or extreme sports), or non-stationary (e.g., another person during extreme sports or athletic training, or a pet or child for safety and control). However, existing utility belts and leashes are bulky and severely limit the user's range of motion. Many such belts or leashes are one-dimensional and lack functionality and efficiency, which results in frustration and inconvenience, wasted time, decreased safety and control. Examples of leash systems include fabric leashes attached to belts using clip systems. Although "hands-free", these designs do not offer 360-degree rotation of the leash around the user's waist. As such, the user's range of motion continues to be limited. Moreover, when used to walk a dog while the user walks or runs, these designs may be dangerous if the dog suddenly stops or moves from one side of the user to the other. If more than one dog leash is attached to the belt, the leashes can become tangled. Because the leash does not rotate around the belt, any such movement may pull the user off-balance and cause the user to trip, fall, or be moved into the path of traffic or other dangerous situation.

Previous attempts to improve such systems include the invention disclosed in U.S. Pat. Pub. No. 2015/0013619, entitled "Pet Leash Belt Device", by Robert J. Kahana, Jr., which discloses a fabric belt worn by pet owners and features a sliding ring mechanism on which the wearer secures a standard pet leash. Although this design improves functionality by allowing increased range of motion, it lacks customization, durability and strength, and versatility for use in applications other than as a pet leash.

The present invention is aimed at one or more of the problems identified above.

BRIEF SUMMARY OF THE INVENTION

A hands-free utility belt system is disclosed. The system includes a flexible belt, a removable bumper locking mechanism, a bumper, and a lead carrier. The flexible belt includes a plurality of apertures and has a first section and a second section, wherein the first section is configured to overlap the second section. The removable bumper locking mechanism is configured to lock together the first section and the second section of the belt. The removable bumper locking mechanism includes a lock and a mounting plate. The lock is configured to couple the removable locking system to the flexible belt through one of the plurality of apertures. The bumper is coupled to the mounting plate. The lead carrier is coupled to the belt and includes a body having an opening on one side and at least one micro-roller, and a lead connector coupled to the body by a post.

According to another aspect of the invention, another hands-free utility belt system is disclosed. The utility belt system includes a flexible belt, a removable bumper locking mechanism, a bumper, and a lead carrier. The flexible belt includes a plurality of apertures and has a first section and a second section, wherein the first section is configured to overlap the second section. The removable bumper locking mechanism is configured to lock together the first section and the second section of the belt. The removable bumper locking mechanism includes a lock and a mounting plate. The lock is configured to couple the removable locking system to the flexible belt through one of the plurality of apertures. The bumper is coupled to the mounting plate. The lead carrier is coupled to the belt and includes a body having an opening on one side and at least one micro-roller, and a lead connector coupled to the body by a post. The system further includes a secondary bumper locking mechanism including a second lock and a threaded barrel. The second lock includes a head and a second post, and the second post includes a dowel configured to couple the post to the threaded barrel. The flexible belt further includes a plurality of secondary apertures configured to receive the second bumper locking mechanism.

BRIEF DESCRIPTION OF THE DRAWINGS

Other advantages of the present invention will be readily appreciated as the same becomes better understood by reference to the following detailed description when considered in connection with the accompanying drawings wherein.

Corresponding reference characters indicate corresponding parts throughout the drawings.

DETAILED DESCRIPTION OF THE INVENTION

With reference to the drawings and in operation, the present invention overcomes at least some of the disadvantages of known utility belts. Persons of ordinary skill in the art will realize that the following description of the presently invention is illustrative only and not in any way limiting. Other configurations of the invention will readily suggest themselves to such skilled persons.

Figure 1:
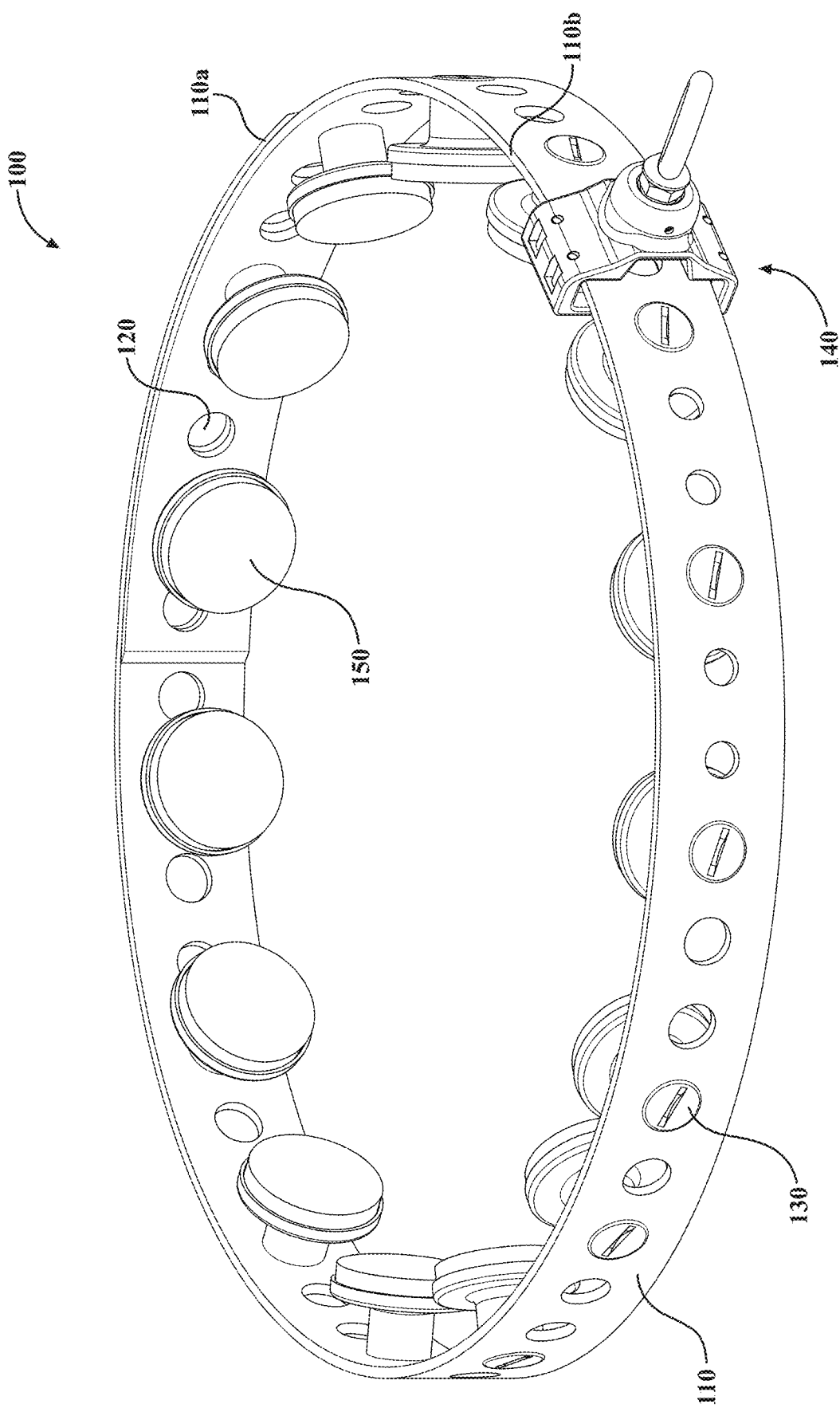
FIG. 1 is a perspective view of the utility belt system, according to a first configuration of the present invention, shown in an assembled arrangement.
Figure 2:
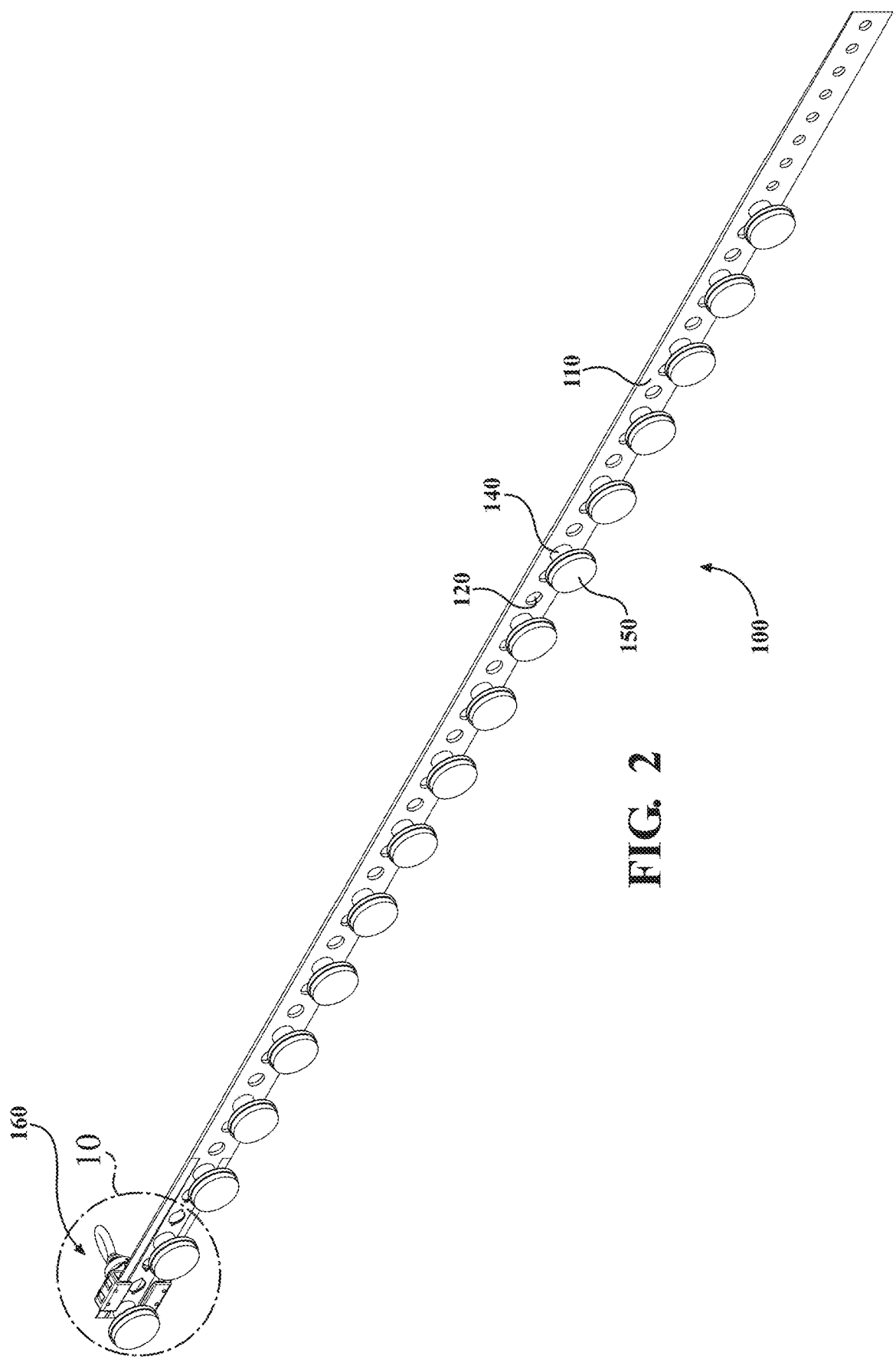
FIG. 2 is a second perspective view of the utility belt system shown in FIG. 1.
Figure 3:
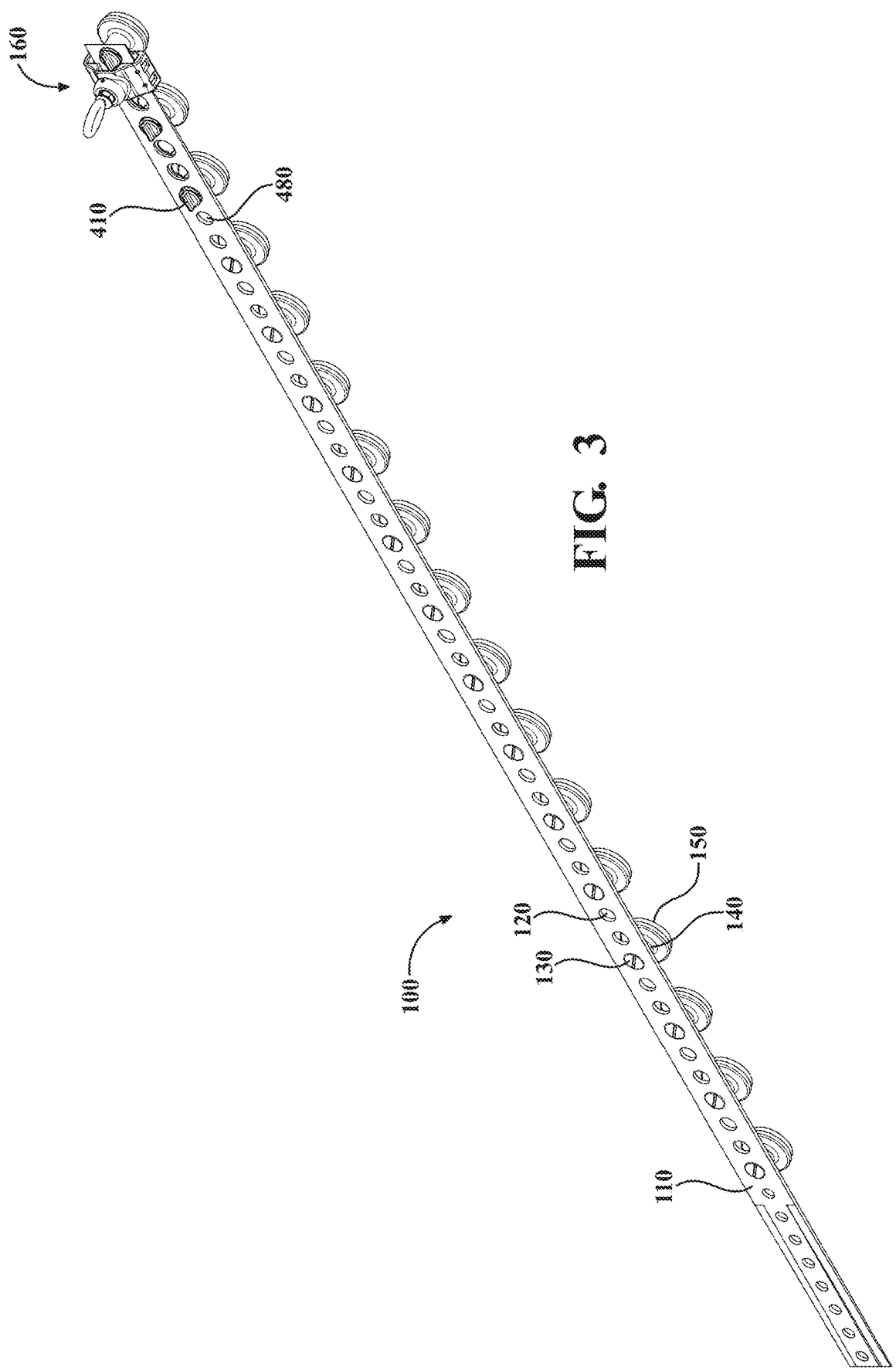
FIG. 3 is a third perspective view of the utility belt system shown in FIGS. 1-2.
Figure 4:
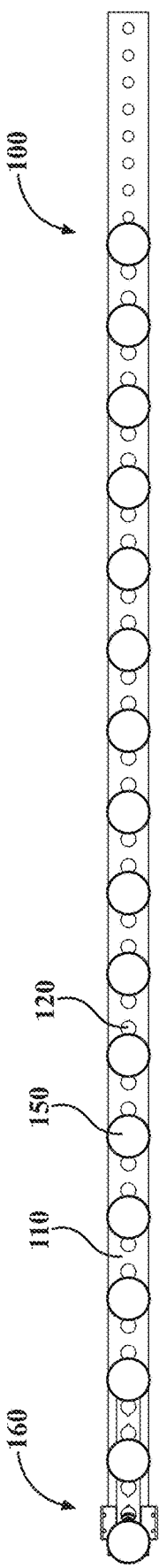
FIG. 4 is a front view of the utility belt system shown in FIGS. 1-3.
Figure 5:
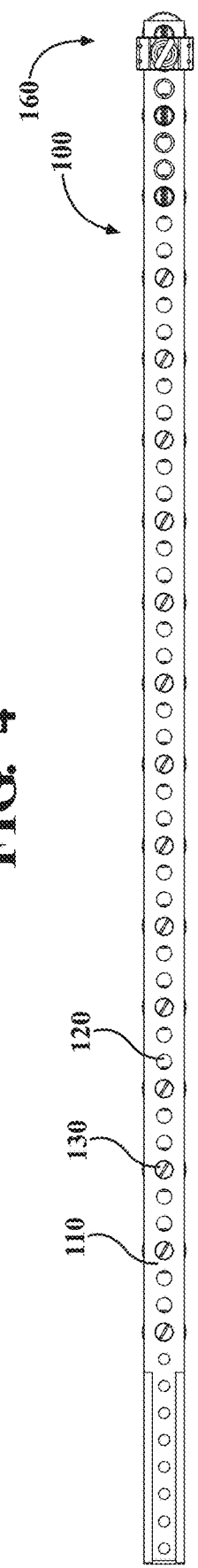
FIG. 5 is a rear view of the utility belt system shown in FIGS. 1-3.
Figure 6:
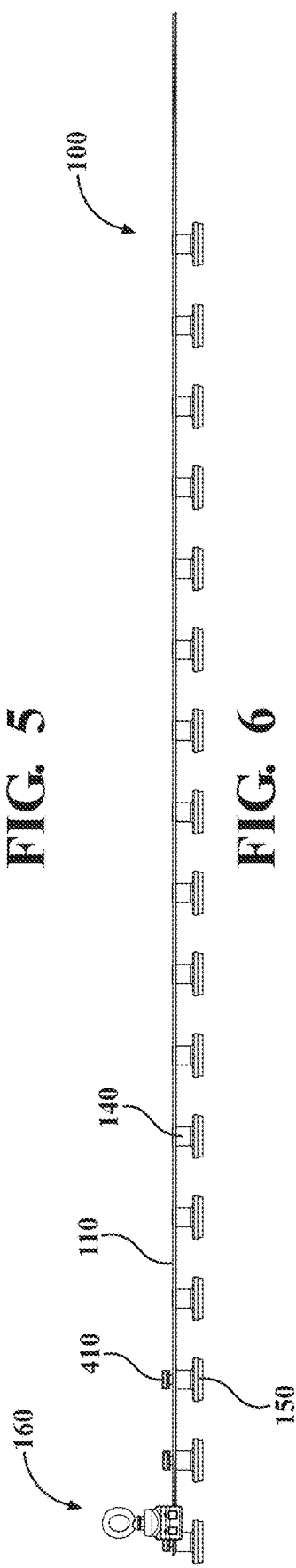
FIG. 6 is a top view of the utility belt system shown in FIGS. 1-3.
Figure 7:
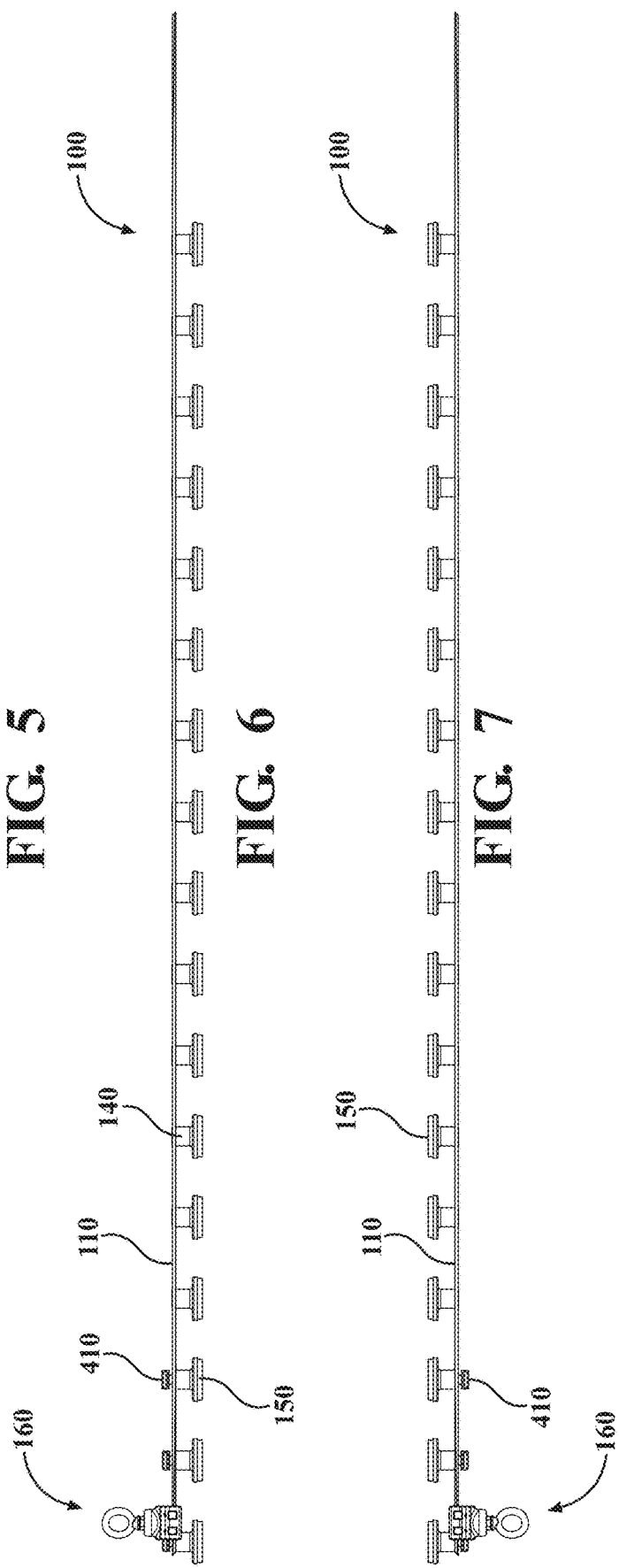
FIG. 7 is a bottom view of the utility belt system shown in FIGS. 1-3.

Referring now to FIG. 1, a perspective view of the utility belt system 100 according to a first configuration of the present invention is shown in an assembled arrangement. FIGS. 2-3 illustrate perspective views of utility belt system 100 of FIG. 1, FIGS. 4-5 illustrate front and rear views of utility belt system 100, and FIGS. 6-7 illustrate top and bottom views of utility belt system 100, all shown in a disassembled arrangement. A belt 110 may be comprised of any sturdy yet flexible material, including, for example, polyvinyl chloride (PVC) or other synthetic plastic polymers. Belt 110 may include a plurality of apertures, one of which is labeled 120.

Through each aperture 120 may optionally be placed a removable bumper locking mechanism comprising a lock, one of which is labeled 130, and a mounting plate, one of which is labeled 140. The locking mechanisms of utility belt system 100 are described in further detail below with respect to FIGS. 12A-12B and 13A-13C.

A bumper, one of which is labeled 150, may be coupled to mounting plate 140. Bumper 150 may be any shape and size (and may be different within the same system 110), and may be comprised of a shock-absorbing material such as foam or other suitable material. As shown in FIG. 1, all bumpers 150 are round. Bumpers 150 may be used in any number, combination, and arrangement as needed for a particular application and/or for the comfort of the user. For example, a user with a smaller frame may require more bumpers 150 to ensure a snug fit of belt 110 around the user's waist, whereas a person with a larger frame may find it more comfortable to use fewer bumpers 150 and/or bumpers 150 spaced further apart. Likewise, it may be desirable for use in sports training to use more or larger bumpers 150, or to use only or more bumpers 150 against certain areas of the belt 110, due to the potential for high-impact movements against the user's body or certain parts of the user's body.

A lead carrier 160 may be coupled to belt 110. The lead carrier 160 is described in further detail below with respect to FIGS. 8-11B.

Figure 8:
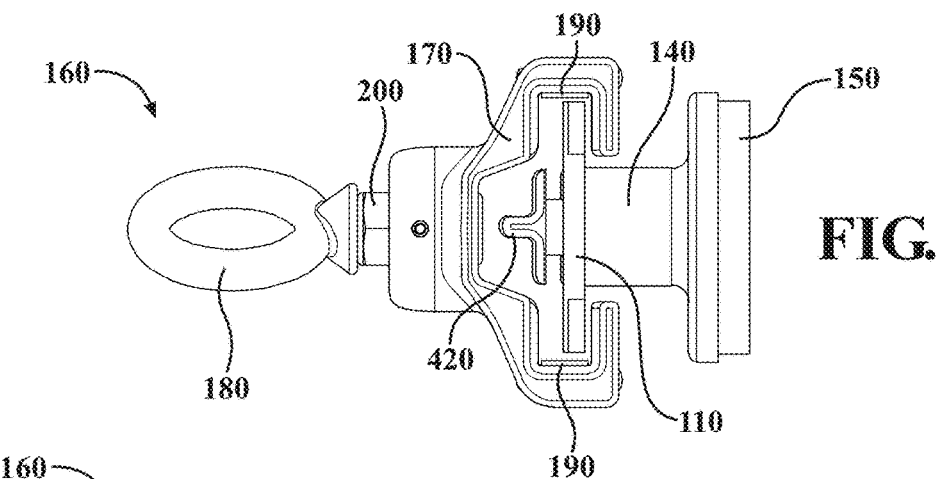
FIG. 8 is a first side view of the utility belt system shown in FIGS. 1-3.
Figure 9:
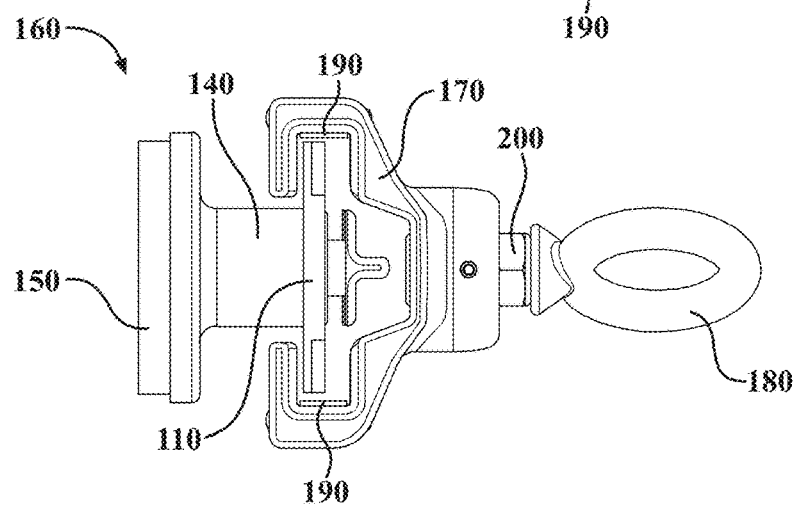
FIG. 9 is a second side view of the utility belt system shown in FIGS. 1-3.
Figure 10:
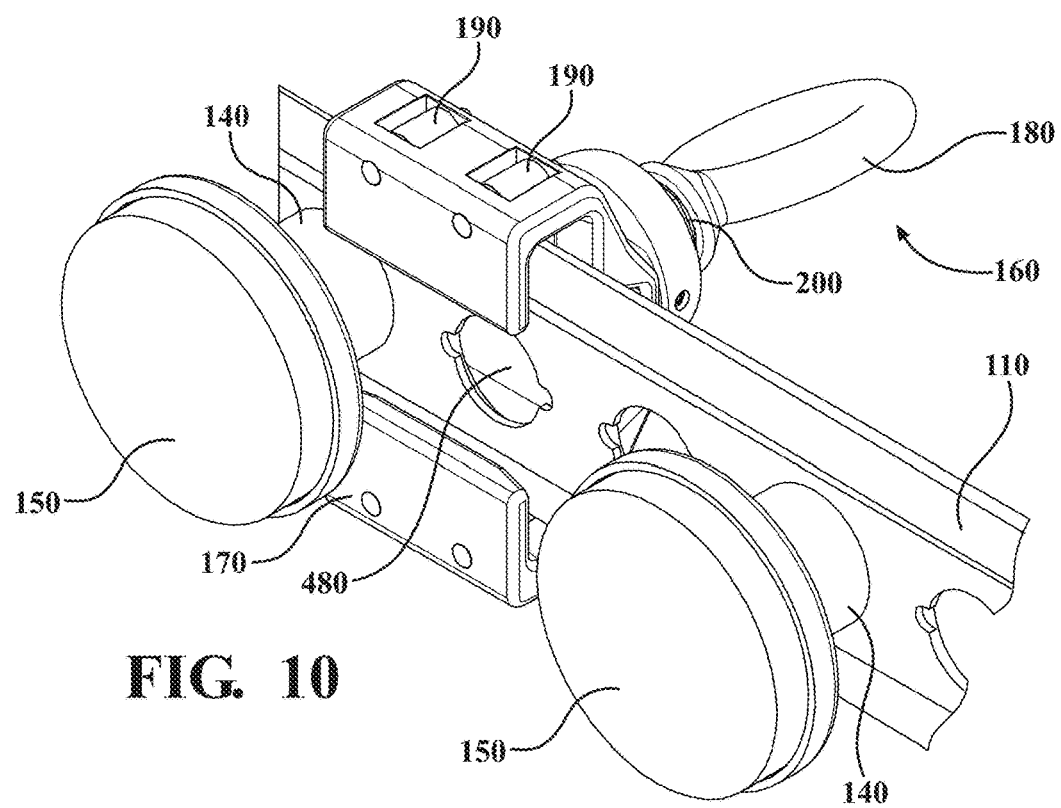
FIG. 10 is a partial perspective view of the utility belt system shown in FIG. 2.

Referring now to FIGS. 8-9, side views of utility belt system 100 are illustrated. Lead carrier 160 includes a body 170 and a lead connector 180. Body 170 may be configured to surround belt 110, having an opening on at least on side such that lead carrier 160 is able to freely move along the length of belt 110 without being obstructed by other parts of system 100, for example, mounting plates 140. Body 170 may further include a plurality of micro-rollers 190. Micro-rollers 190 may come into contact with one or more sides of belt 110 and assist lead carrier 160 to move smoothly about belt 110.

Lead connector 180 may be coupled to lead body 170 via a post 200. In some configurations, post 200 may be a screw. Lead connector 180 may be in the shape of a ring, as illustrated, or it may be in any other suitable shape such that a lead (such as a leash) may be readily attached to it, either by itself or via a clip or latch.

Figure 11A:
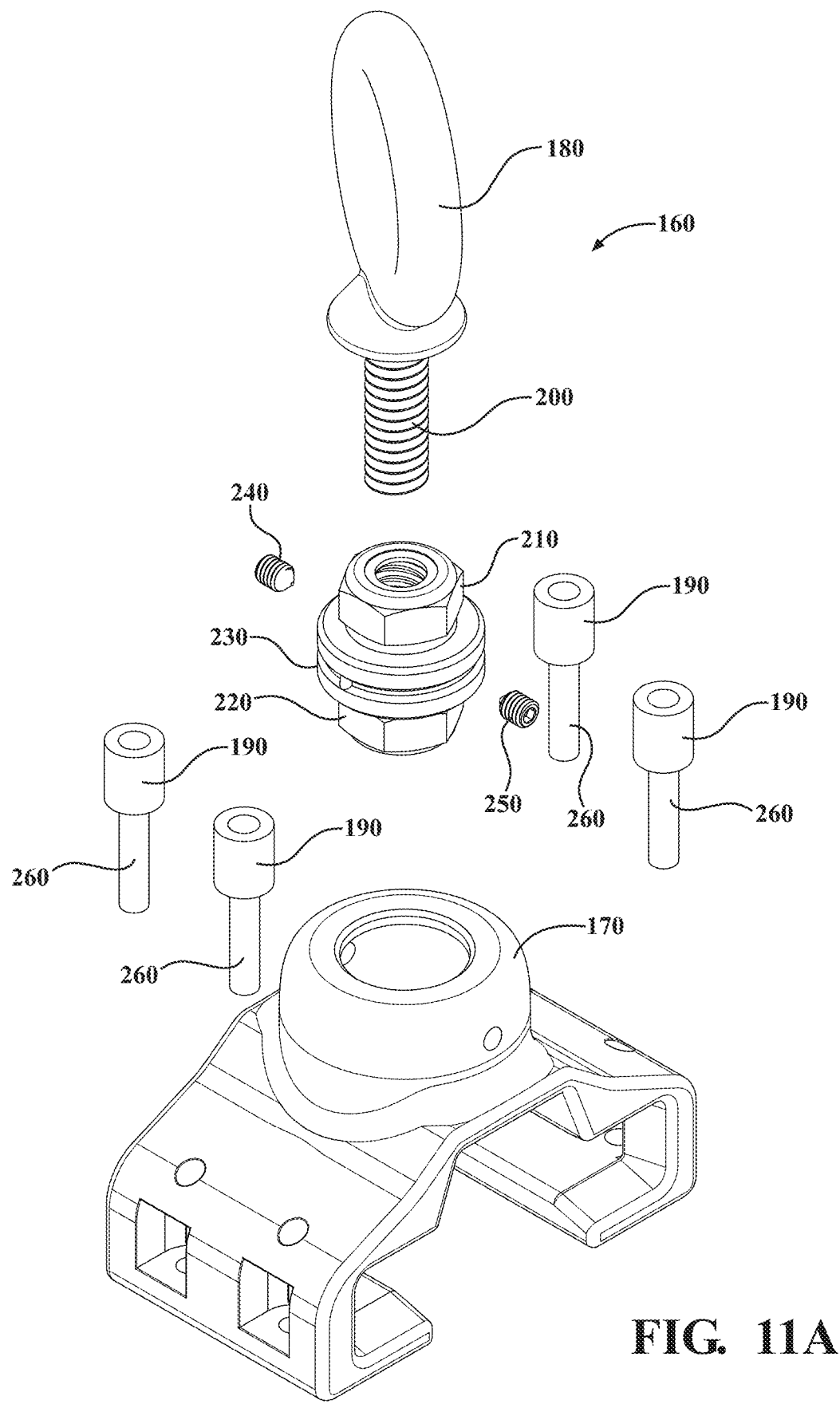
FIG. 11A is an exploded perspective view of a lead carrier of the utility belt system shown in FIGS. 1-3.
Figure 11B:
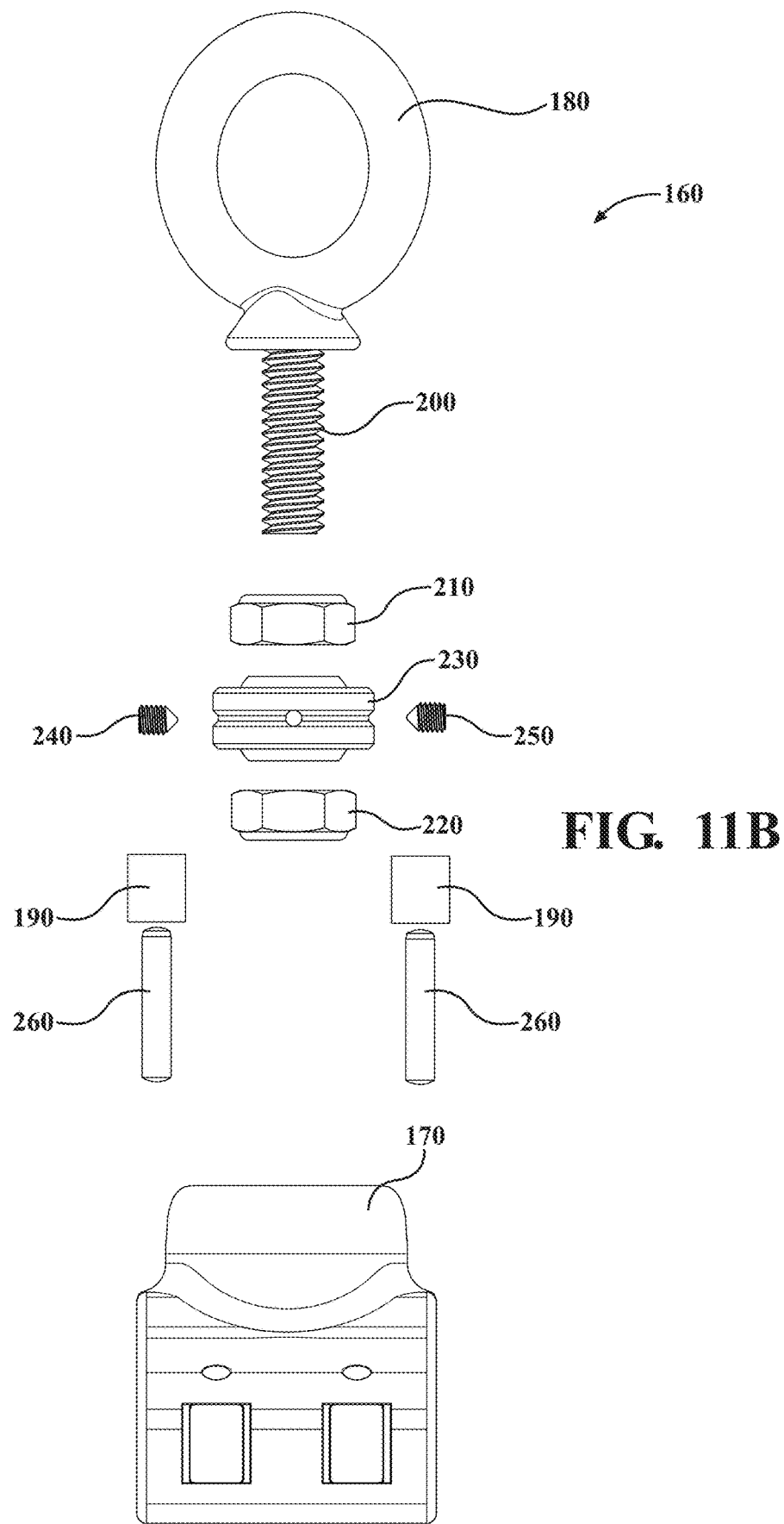
FIG. 11B is an exploded front view of a lead carrier of the utility belt system shown in FIGS. 1-3.

Referring now to FIGS. 11A-11B, an exploded perspective view and an exploded front view of lead carrier 160 are illustrated. In configurations where post 200 is a screw, lead carrier 160 may also include two locknuts 210, 220 and a swivel joint 230. Swivel joint 230 is contained within body 170 and held in place by point set screws 240, 250. Post 200 passes through first locknut 210, then swivel joint 230 (through body 170), and finally through second locknut 220. Micro-rollers 190 are held into place within body 170 by dowel pins 260.

Figure 12A:
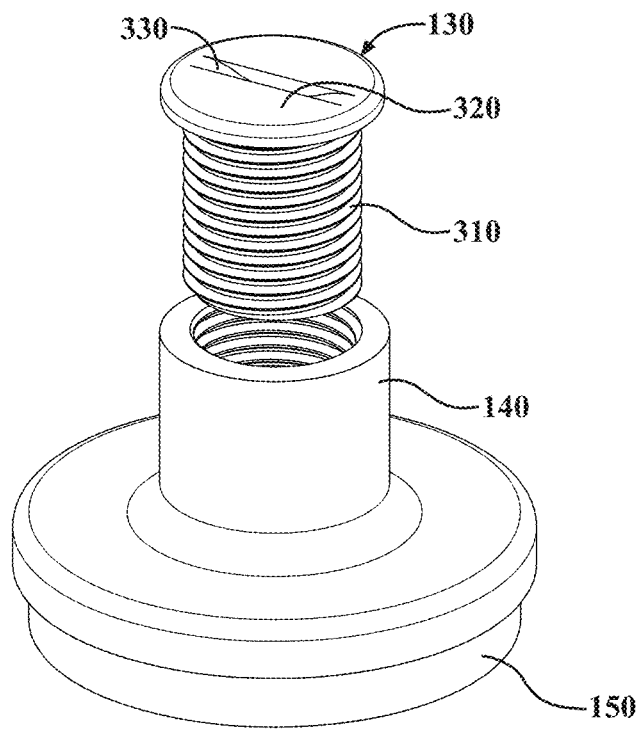
FIG. 12A is an exploded perspective view of a bumper locking mechanism of the utility belt system shown in FIGS. 1-3.
Figure 12B:
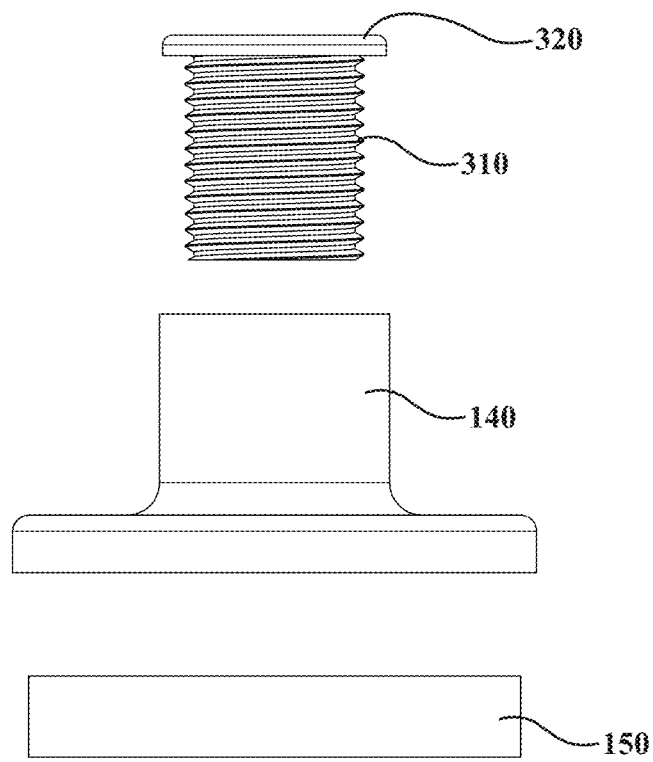
FIG. 12B is an exploded front view of a bumper locking mechanism of the utility belt system shown in FIGS. 1-3.

Referring now to FIGS. 12A-12B, an exploded perspective view and an exploded front view of a bumper locking mechanism 300 of utility belt system 100 are illustrated. As previously discussed, a lock 130 may be placed through aperture 120 of belt 110. In some configurations, lock 130 comprises a screw having a threaded post 310 and a head 320. The threaded post 310 may be configured to couple with mounting plate 140, which may be threaded to interlock with threaded post 310. Head 320 may include a recess 330 (illustrated as a slot recess) to allow the user to turn the lock 130.

Figure 13A:
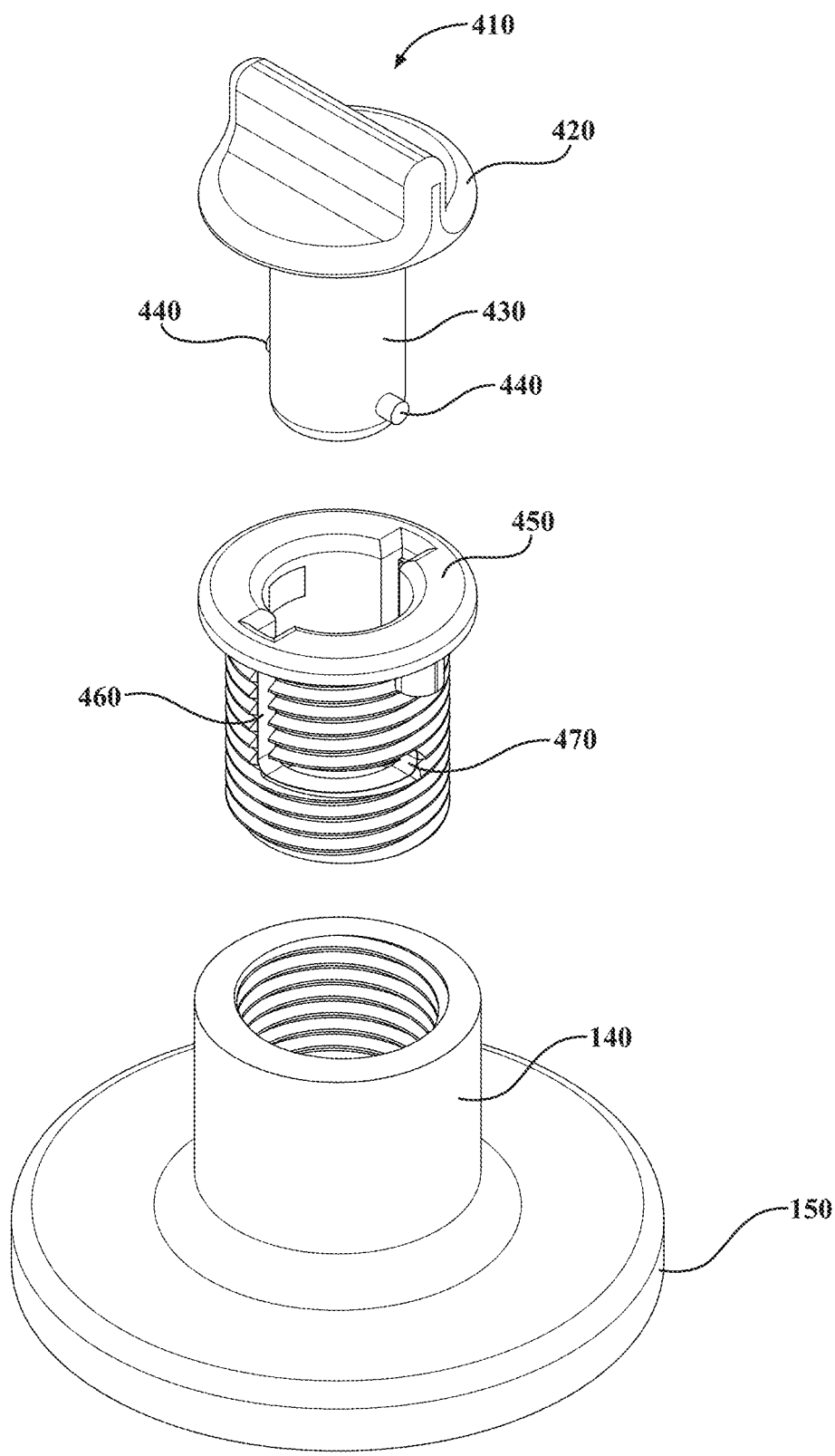
FIG. 13A is an exploded perspective view of a second bumper locking mechanism of the utility belt system shown in FIGS. 1-3.
Figure 13B:
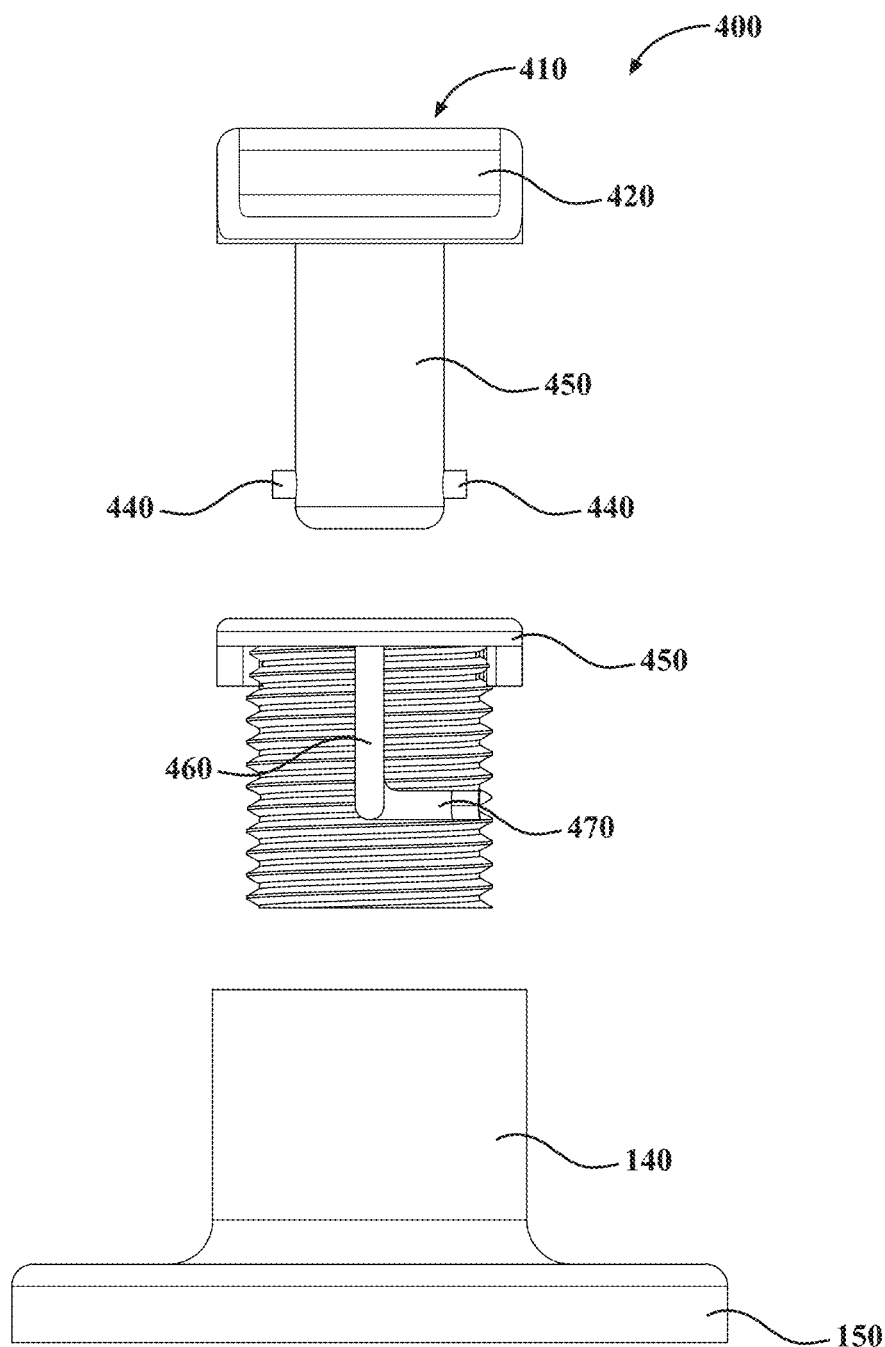
FIG. 13B is an exploded front view of a second bumper locking mechanism of the utility belt system shown in FIGS. 1-3.
Figure 13C:
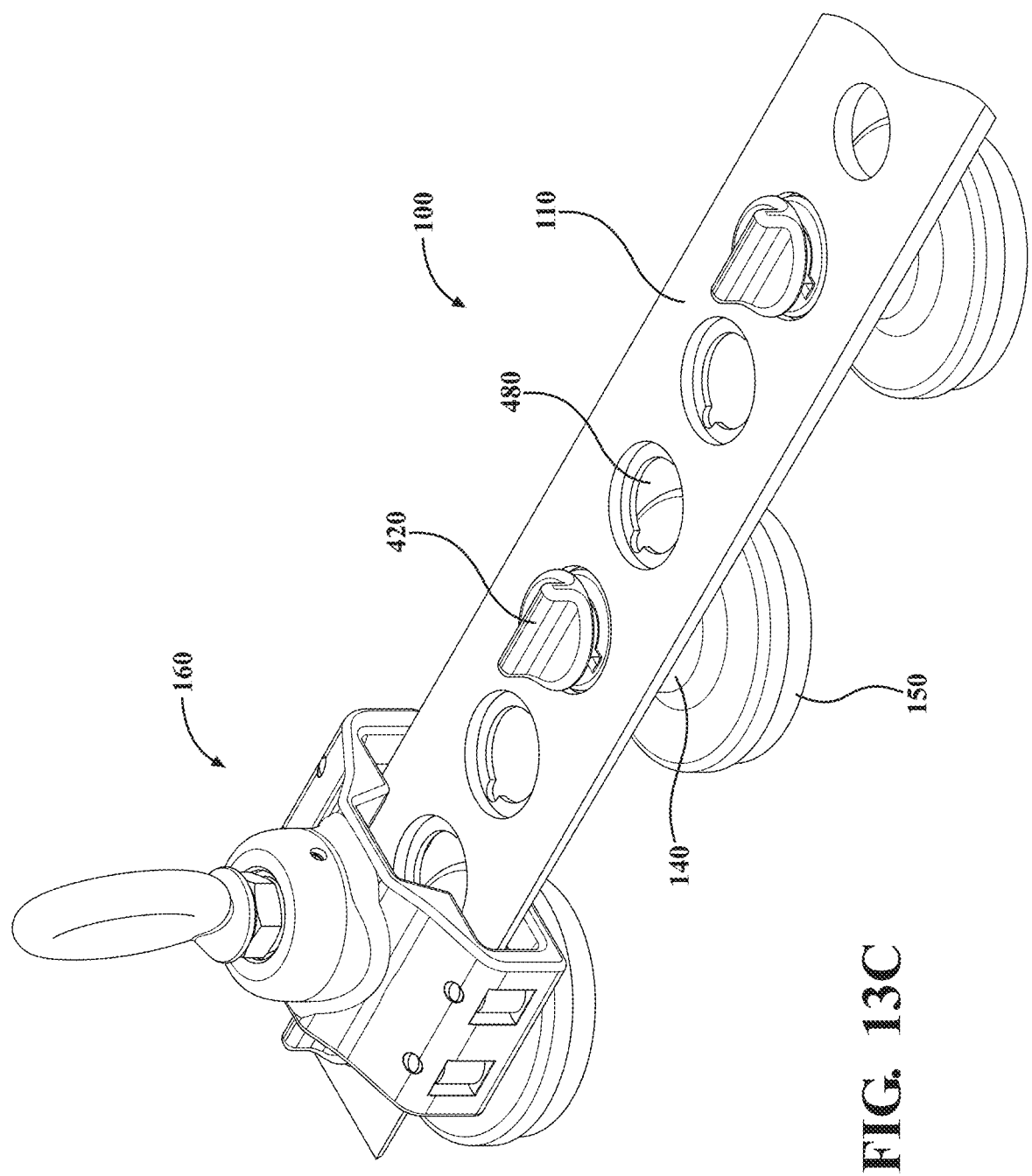
FIG. 13C is a partial perspective view of the assembled second bumper locking mechanism of the utility belt system shown in FIGS. 1-3.

Bumper locking mechanism 300 may be used to lock in place two overlapping sections of belt 110, shown in FIG. 1 as first section 110a overlapping with second section 110b. However, in some configurations, a second bumper locking mechanism 400 is used to lock in place two overlapping sections of belt 110. Referring now to FIGS. 13A-13B, an exploded perspective view and an exploded front view of a second bumper locking mechanism 400 of utility belt system 100 are illustrated. A second lock 410 comprises a head 420 and a post 430. Post 430 includes a dowel 440. A threaded barrel 450 may include side slots 460 to receive post 430 with dowel 440 and a cam slot 470 to lock dowel 440 into place once post 430 is threaded into barrel 450. Mounting plate 140 may be threaded to interlock with threaded barrel 450. Referring now to FIG. 13C, a partial perspective view of the assembled second bumper locking mechanism 400 of utility belt system 100 is illustrated. In the illustrated configuration, the belt 110 contains apertures 120 for receiving bumper locking mechanisms 300 as well as second apertures 480 for receiving second bumper locking mechanisms 400. Second apertures 480 comprise a shape configured to receive dowel 440 and recessed to receive at least part of head 420.

Figure 14:
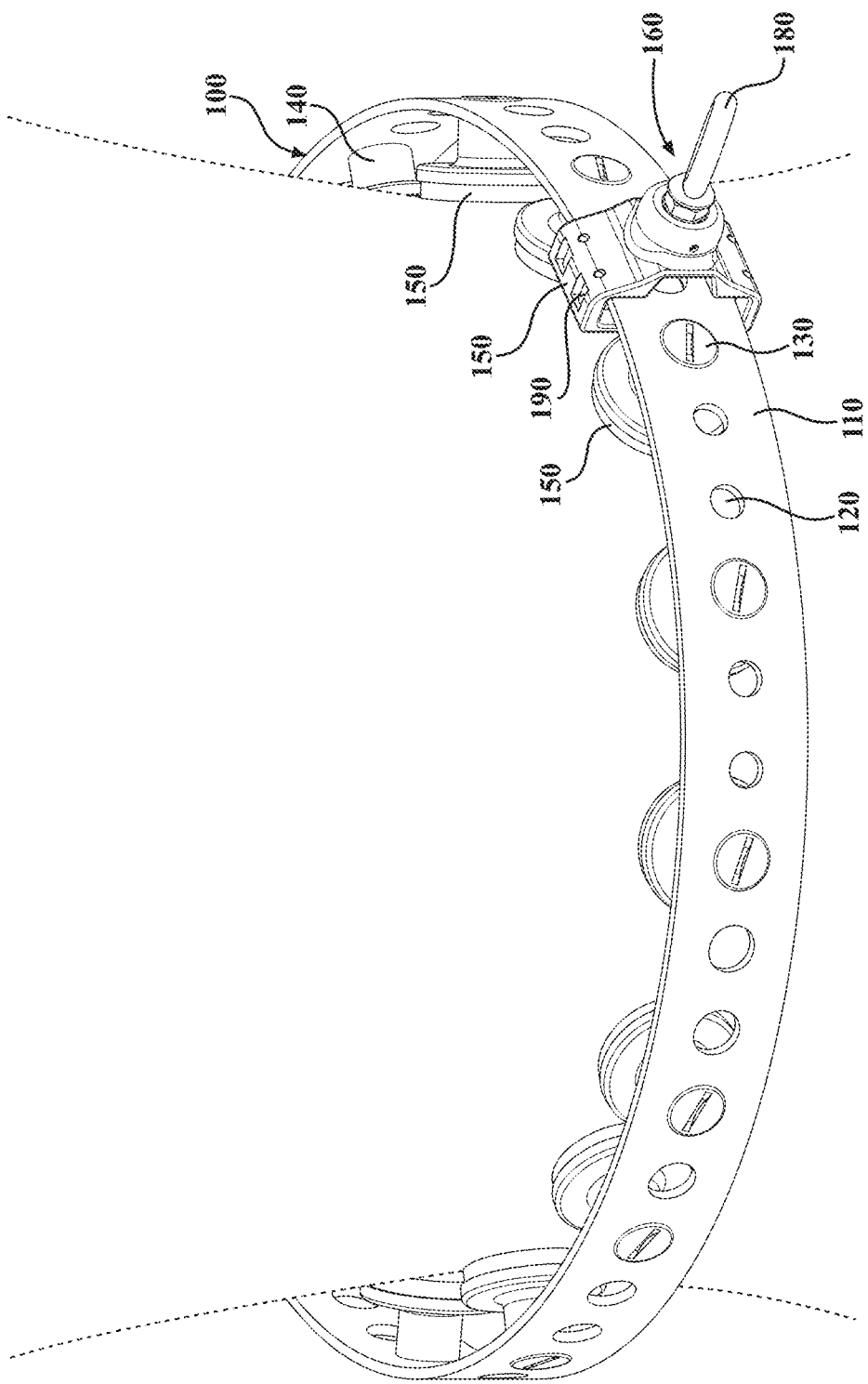
FIG. 14 is a perspective view of the utility belt system shown in FIGS. 1-3, shown in an assembled arrangement in its environmental use.

Referring now to FIG. 14, a perspective view of utility belt system 100 is shown in an assembled arrangement in its environmental use. The size of belt 110 is configurable according to the size of the user's waist because of the numerous apertures 120/480 that can overlap one another and be locked into place using bumper locking mechanism 300 and/or second bumper locking mechanism 400.

Figure 15:
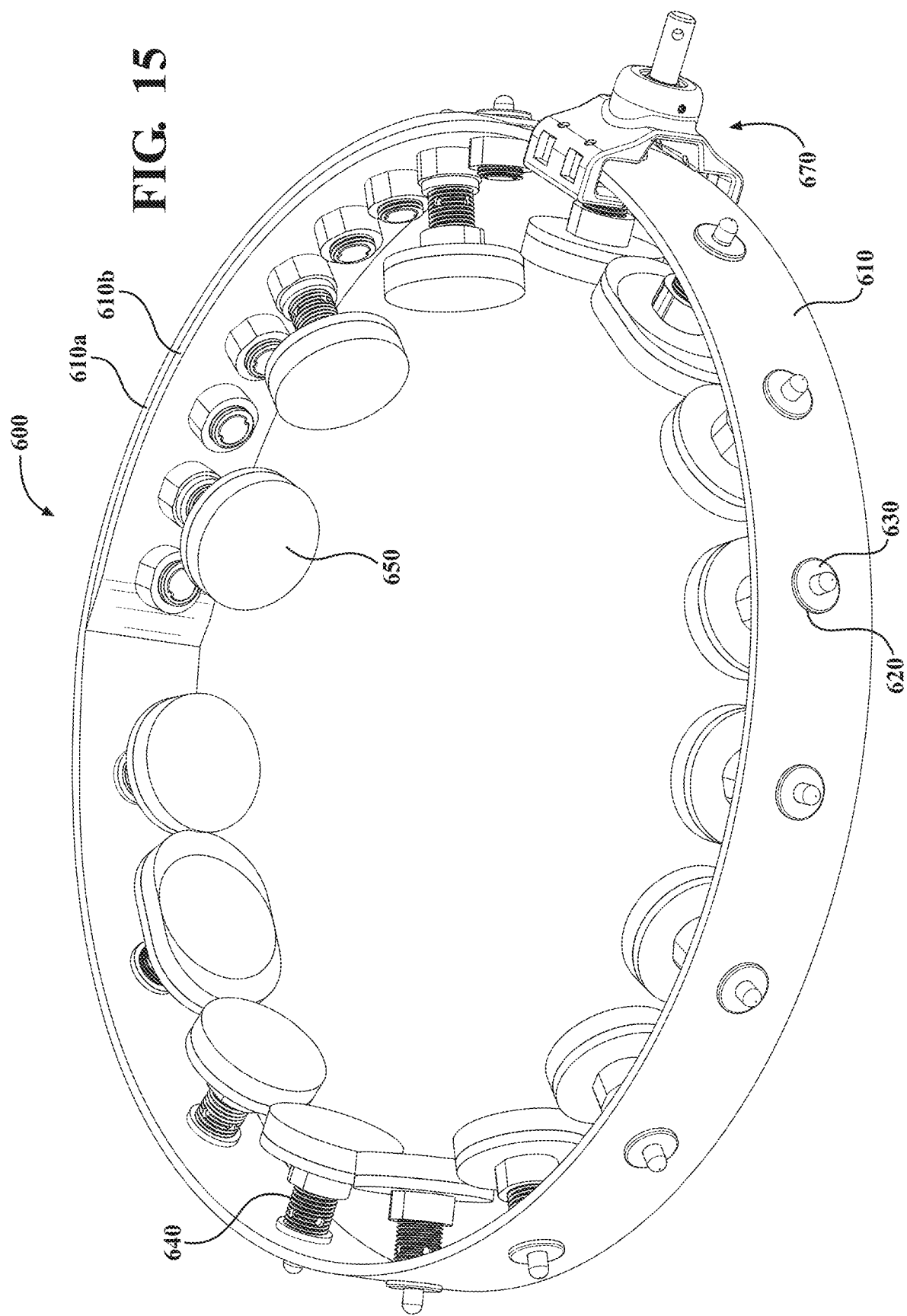
FIG. 15 is a perspective view of an assembled utility belt system, according to a second configuration of the present invention.

Referring now to FIG. 15, a perspective view of a utility belt system 600 according to a second configuration is illustrated. A belt 610 may be comprised of any sturdy yet flexible material, including, for example, polyvinyl chloride (PVC) or other synthetic plastic polymers. Belt 610 may include a plurality of apertures, one of which is labeled 620. Through each aperture 620 may optionally be placed a lock, one of which is labeled 630, of a removable bumper locking mechanism, one of which is labeled 640. In some configurations, lock 630 may be spring-loaded. A user may press the lock 630 to disconnect lock 630, and thus removable bumper locking mechanism 640, from belt 610. Lock 630 may also be used to lock in place two overlapping sections of belt 610, labeled 610a and 610b in FIG. 15.

A bumper 650 may be coupled to bumper locking mechanism 640. Bumper 650 may be any shape and size and may be comprised of a shock-absorbing material such as foam or other suitable material. Bumpers 650 may be used in any number and combination as needed for a particular application and/or for the comfort of the user. For example, a user with a smaller frame may require more bumpers 650 to ensure a snug fit of belt 610 around the user's waist. Likewise, it may be desirable for use in sports training to use more bumpers due to the potential for high-impact movements against the user's body.

Figure 16:
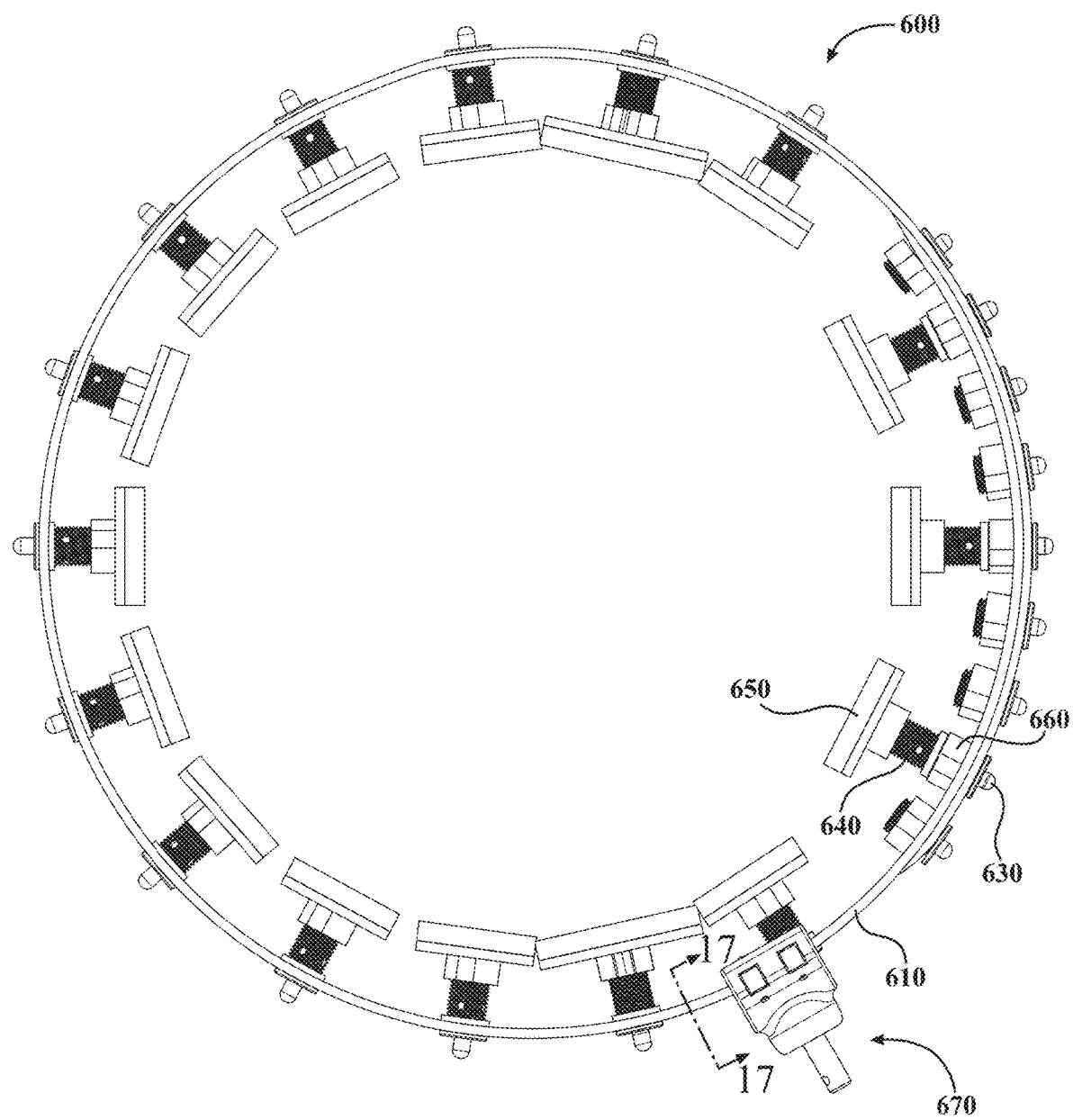
FIG. 16 is a top view of the utility belt system shown in FIG. 15.

Referring now to FIG. 16, a top view of the utility belt system of FIG. 15 is illustrated. An optional washer 660 may be coupled to bumper locking mechanism 640 for additional stability. A lead carrier 670 may be coupled to belt 610.

Figure 17:
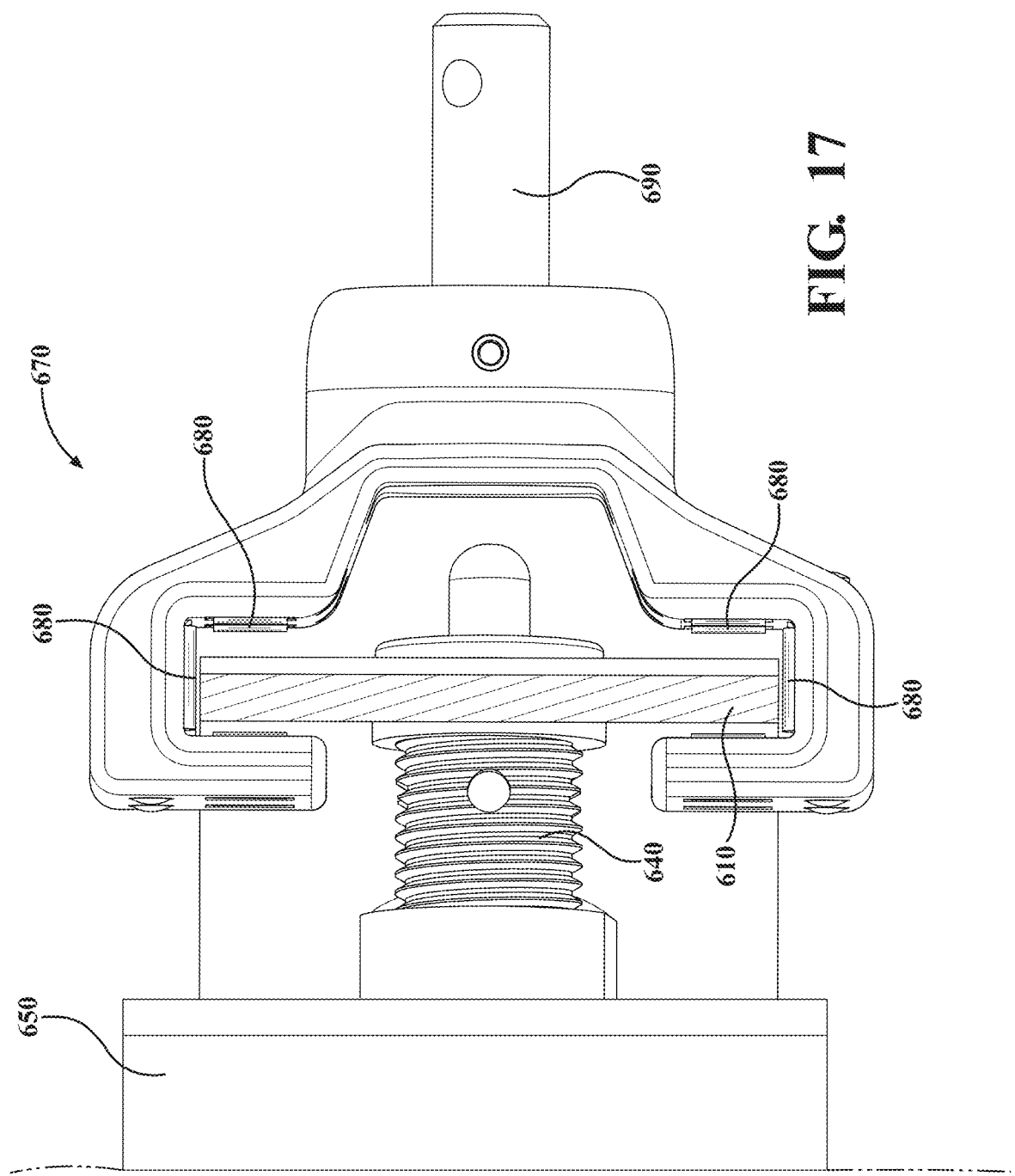
FIG. 17 is a partial cross-sectional side view of the utility belt system shown in FIGS. 15-16.

Referring now to FIG. 17, a cross-sectional view of the utility belt system, including lead carrier 670, of FIG. 16 is illustrated. Lead carrier 670 may include a plurality of micro-rollers, some of which are labeled 680, configured to assist lead carrier 670 to move smoothly about belt 610. Lead carrier 670 may further comprise a lead connector 690.

Figure 18:
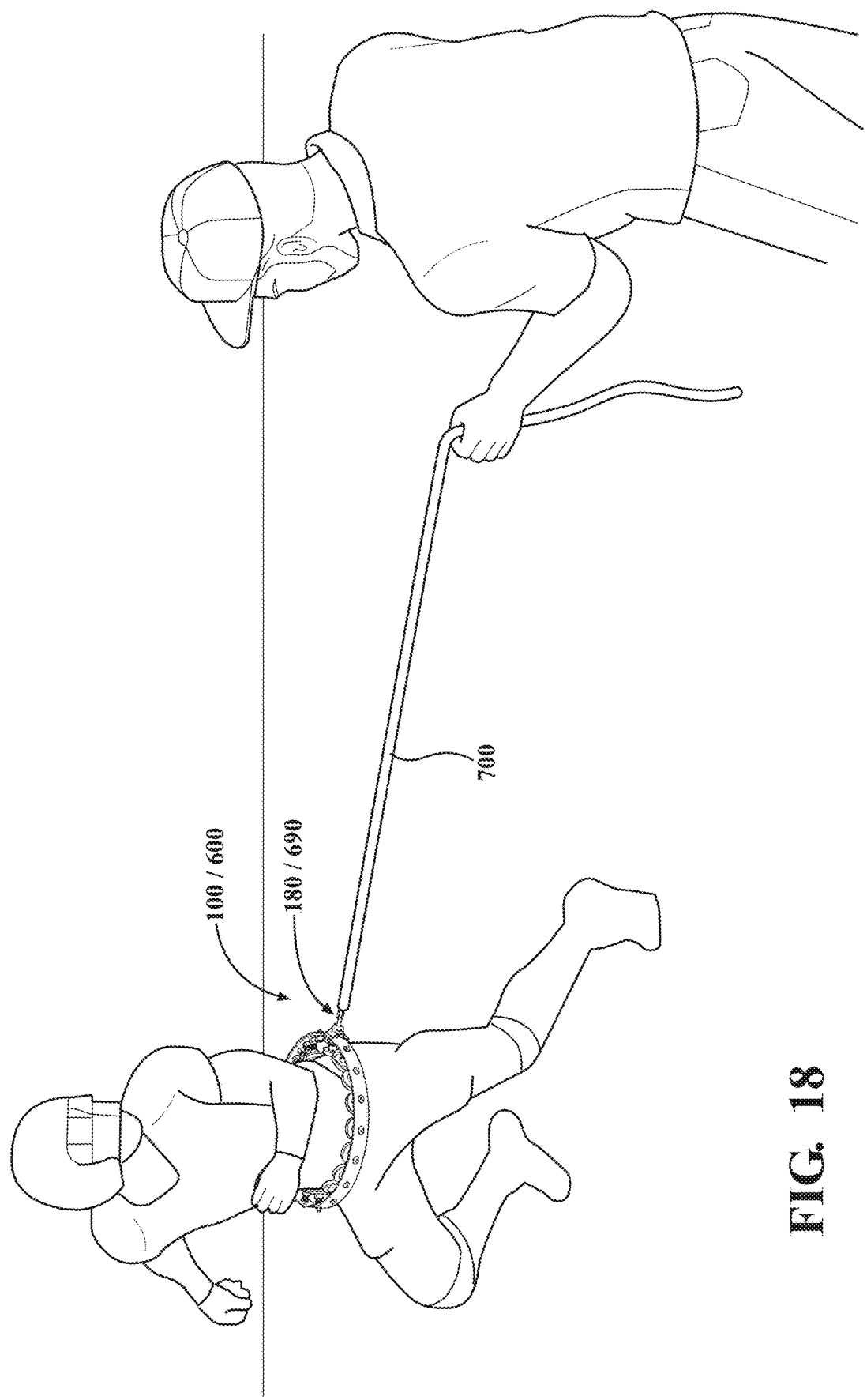
FIG. 18 illustrates an environmental view of the utility belt system.

Referring now to FIG. 18, an environmental view of the utility belt system 100/600 of FIGS. 1 and 15 is illustrated. Lead connector 180/690 may be configured to connect lead carrier 160/670 to a lead 700. Lead connector 180/690 may be connected directly to lead 700 or via another connection mechanism (e.g., a clip, a carabiner, a latch, etc.). When fully assembled, the utility belt system 100/600 allows a user to be tethered to another object, person, or animal completely hands-free, with the lead 700 fully rotatable about the user's waist without obstruction.

It will be apparent to those skilled in the art that the above description provides a hands-free utility belt that confers many advantages over known utility belts. For example, the utility belt of the present invention gives the user a 360-degree range of motion. This increased flexibility of movement will result in increased user satisfaction and safer performance of hands-free activities. It will be apparent that the utility belt of the present invention has virtually limitless applications since any object may be connected to the user wearing the belt. By way of example and not limitation, the utility belt as disclosed herein may have applications in the following fields: pet leashes, child safety harnesses and restraints, extreme sports such as hiking and rock climbing, athletic and recreational equipment, construction equipment, activities performed in video games, virtual reality, and the metaverse, use in gravity free environments and space exploration and travel, and any other activities where it is useful to be physically tethered to another person, animal, building, or object, but without requiring use of the hands.

By way of example and not limitation, the system of the present invention could be used in various ways in a virtual reality environment to prevent a user from walking into walls. For instance, the system could tether the user to a hook in the ceiling (to keep the user centered within a room), and/or tethered directly to a wall or multiple walls within a room or other space designed for a virtual reality experience, to keep the user physically centered within the space.

The above description is illustrative and not restrictive. Many variations of the invention will become apparent to those of skill in the art upon review of this disclosure. While the present invention has been described in connection with a variety of configurations, these descriptions are not intended to limit the scope of the invention to the particular forms set forth herein. To the contrary, the present descriptions are intended to cover alternatives, modifications, and equivalents as may be included within the spirit and scope of the invention as defined by the appended claim and otherwise appreciated by one of ordinary skill in the art.

What is claimed is:

1. A utility belt system comprising:
a flexible belt including a belt body extending between a top end and a bottom end, a plurality of apertures extending through the belt body, and a first section and a second section, wherein the first section is configured to overlap the second section;
a removable bumper locking mechanism configured to lock together the first section and the second section, the removable bumper locking mechanism comprising a lock and a mounting plate, wherein the lock is configured to couple the removable bumper locking mechanism to the flexible belt through one of the plurality of apertures;
a bumper configured to be coupled to the mounting plate; and
a lead carrier slideably coupled to the flexible belt, the lead carrier comprising:
a carrier body comprising a C-shaped cross-sectional shape including a first side and a second side, wherein the first side comprises an opening configured to receive the belt body therein such that the lead carrier is able to freely move along a length of the flexible belt without being obstructed by the removable bumper locking mechanism;
a first pair of micro-rollers coupled to a top portion of the carrier body and configured to contact the top end of the belt body;
a second pair of micro-rollers coupled to a bottom portion of the carrier body and configured to contact the bottom end of the belt body;
a swivel joint housed within the carrier body; and
a lead connector including a closed ring coupled to the carrier body by a post inserted through the swivel joint.

2. The utility belt system of claim 1, wherein the flexible belt is comprised of synthetic plastic polymers.

3. The utility belt system of claim 1, wherein the post comprises a screw.

4. The utility belt system of claim 1, wherein the lock comprises a screw comprising a threaded post and a head.

5. The utility belt system of claim 4, wherein the threaded post is configured to couple with the mounting plate.

6. The utility belt system of claim 4, wherein the head of the lock includes a slot recess.

7. The utility belt system of claim 1, further comprising a second bumper locking mechanism.

8. The utility belt system of claim 7, wherein the second bumper locking mechanism includes a second lock and a threaded barrel.

9. The utility belt system of claim 8, wherein the second lock comprises a head and a second post.

10. The utility belt system of claim 9, wherein the second post of the second lock includes a dowel configured to couple the second post to the threaded barrel.

11. The utility belt system of claim 7, wherein the belt further comprises a plurality of secondary apertures configured to receive the second bumper locking mechanism.

12. A utility belt system comprising:
a flexible belt including a belt body extending between a top end and a bottom end, a plurality of apertures extending through the belt body, and a first section and a second section, wherein the first section is configured to overlap the second section;
a primary removable bumper locking mechanism configured to lock together the first section and the second section, the removable bumper locking mechanism comprising a lock and a mounting plate, wherein the lock is configured to couple the removable bumper locking mechanism to the flexible belt through one of the plurality of apertures;
a bumper coupled to the mounting plate;
a lead carrier slideably coupled to the flexible belt, the lead carrier comprising:
a carrier body comprising a C-shaped cross-sectional shape including a first side and a second side, wherein the first side comprises an opening configured to receive the belt body therein such that the lead carrier is able to freely move along a length of the flexible belt without being obstructed by the primary removable bumper locking mechanism;
a first pair of micro-rollers coupled to a top portion of the carrier body and configured to contact the top end of the belt body;
a second pair of micro-rollers coupled to a bottom portion of the carrier body and configured to contact the bottom end of the belt body;
a swivel joint housed within the carrier body; and
a lead connector including a closed ring coupled to the carrier body by a post inserted through the swivel joint;
a secondary bumper locking mechanism including a second lock and a threaded barrel, wherein the second lock comprises a head and a second post, and wherein the second post includes a dowel configured to couple the second post to the threaded barrel;
wherein the belt further comprises a plurality of secondary apertures configured to receive the secondary bumper locking mechanism.

13. The utility belt system of claim 12, wherein the flexible belt is comprised of synthetic plastic polymers.

14. The utility belt system of claim 12, wherein the post comprises a screw.

* * * * *